April 30, 1940.　　　G. B. POLLOCK　　　2,198,975
SYNCHRONIZED FLASH CAMERA
Filed July 7, 1939
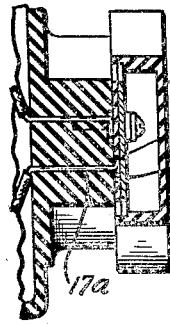
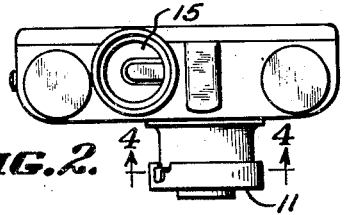
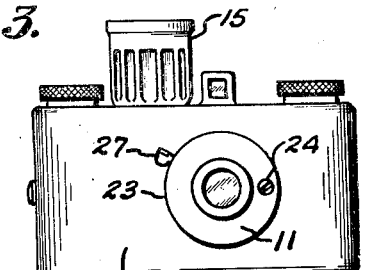
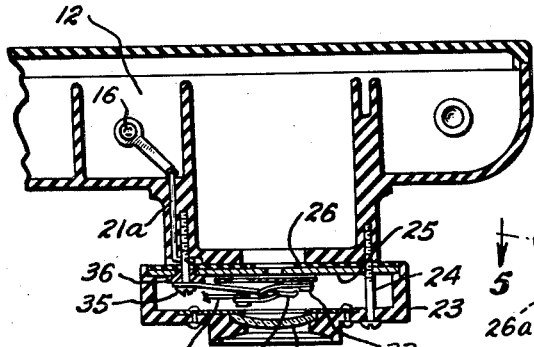
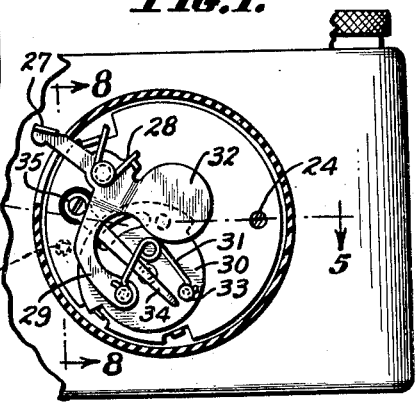
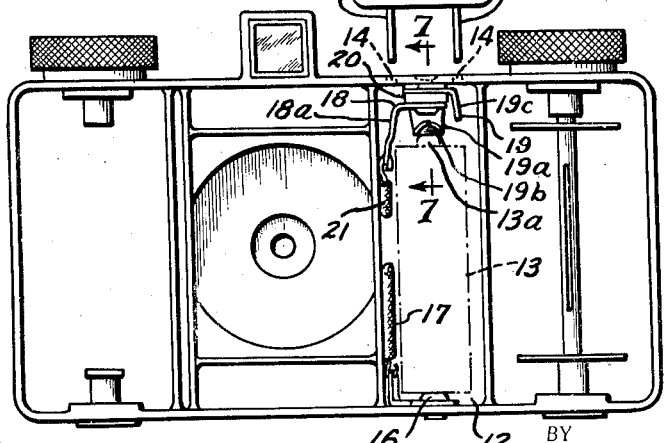
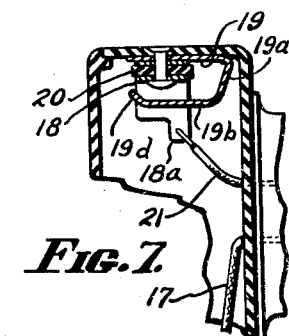
INVENTOR.
GORDON B. POLLOCK.
BY Allen & Allen
ATTORNEYS.

Patented Apr. 30, 1940

2,198,975

UNITED STATES PATENT OFFICE 2,198,975

SYNCHRONIZED FLASH CAMERA

Gordon B. Pollock, Los Angeles, Calif., assignor to Jack Galter, Chicago, Ill.

Application July 7, 1939, Serial No. 283,239

2 Claims. (Cl. 67—29)

This invention relates to cameras in which provision is made for synchronizing with the shutter, a flash circuit whereby pictures may be taken under any adverse light conditions.

With the increasing success enjoyed by certain expensive foreign made miniature cameras, a new style in camera appearance has been launched. The cameras in question are non-symmetrical in appearance, that is, the lens is not mounted centrally of the front wall of the camera body but rather slightly to one side. This is done in the cameras above mentioned for a definite reason in that there is certain mechanism in connection with film transport and shutter operation which necessitates the extra space.

On account of the success enjoyed by these cameras, the off-center lens style has come to be considered desirable and numerous cameras of inexpensive types now on the market provide an off-center lens mounting for no purpose whatever except to follow the style of a non-symmetrical lens arrangement.

In some cameras the non-symmetrical arrangement is achieved by simply extending the camera body to one side and leaving a certain amount of space, which in some cases is used to carry a spare roll of film.

It is an object of my invention to utilize this space in a camera in which such a space is provided for style reasons rather than for any functional reasons and to provide for a circuit including a dry cell, a flash bulb, and a shutter operated contact whereby synchronous flash pictures may be made.

It is another object of my invention to provide such an arrangement which will be extremely simple and very inexpensive and which will yet give perfect synchronization. A further object of my invention resides in the provision of means whereby an ordinary light socket having prongs thereon may be utilized for holding the flash bulb, which socket may simply be plugged into the camera by means of slots in the camera body.

These and other objects of my invention which will be described more in detail hereinafter, or which will be apparent to one skilled in the art upon reading these specifications, I accomplish by that certain construction and arrangement of parts of which I shall now describe an exemplary embodiment. Reference is made to the drawing forming a part hereof and in which:

Figure 1 is a front elevation of a camera provided with a flash arrangement according to my invention.

Figure 2 is a plan view of the same.

Figure 3 is a rear view of the same showing the flash bulb socket separated from the camera body.

Figure 4 is a partial cross sectional view on a larger scale taken on the line 4—4 of Figure 2.

Figure 5 is a partial cross sectional view taken on the line 5—5 of Figure 4.

Figure 6 is a rear view similar to Figure 3 but on an enlarged scale and with the back of the camera removed.

Figure 7 is a partial cross sectional view taken on the line 7—7 of Figure 6.

Figure 8 is a partial cross sectional view taken on the line 8—8 of Figure 4.

Briefly, in the practice of my invention, I avail myself of a camera of the type having a body 10 with a lens system generally indicated at 11 mounted off-center. By reference to Figure 6, it will be observed that a camera of this type has a compartment indicated at 12 which serves no useful purpose except to lengthen that side of the camera body, and perhaps permit the carrying of a spare roll of film. I place within this compartment 12 a dry cell indicated at 13 in broken lines and cut slots 14 in the top wall above the compartment 12 whereby a conventional plug-in type of socket indicated at 15 may be utilized, and I provide an electrical circuit from the battery to the socket and including contacts operable in connection with the shutter.

As shown best in Figure 6, I rivet to the bottom wall of the camera a contact element 16 having a lead 17 attached thereto. The contact 16 is adapted to be engaged by the bottom terminal of the dry cell 13. To the top wall I rivet a pair of contacts indicated respectively at 18 and 19, these contacts being separated by an insulating washer 20. A lead 21 is connected to the contact 18. As will be observed by reference to the Figures 6 and 7, the contact 19 has an arm bent downwardly as at 19a and again horizontally as at 19b to provide a portion adapted to be contacted by the central terminal 13a of the dry cell. The contact 19 also has a downwardly and slightly outwardly bent arm 19c for a purpose to be described hereinafter. In order to permit ready insertion of a dry cell it may be found advisable to bend the end of the portion 19b upwardly a slight amount as indicated at 19d.

The contact 18 has a downwardly and slightly outwardly extending portion 18a to which the lead 21 is connected and it will be noted that the slope of the portions 18a and 19c crosses underneath the slots 14 so that when the socket 15 is inserted with the prongs 15a and 15b thereof passing through the slots 14, the prongs 15a and 15b will make contact respectively with the elements 19c and 18a.

Referring now more particularly to Figures 4, 5 and 8 a lens 22 is mounted in housing 23 arranged to be attached to the camera body as by means of screws 24. The shutter mechanism itself is mounted upon a metal disc 25 which in turn rests upon an insulating disc 26.

The shutter itself is of conventional type including a release button 27 urged upwardly in Figure 4 by means of a spring 28 and having an arm 29 connected to the shutter disc 30 by means of spring 31. A cover plate 32 is also provided to close the lens opening during return movement of the shutter. The shutter mechanism will not be described in further detail since it of itself forms no part of my invention.

It will be observed that the spring 31 is attached to the shutter 30 by means of a rivet 33. I provide a contact finger 34 fastened to the camera body as by means of a screw 35 and positioned so that as the shutter is actuated, the rivet 33 will make contact with the end of the finger 34.

The lead 21 shown in Figure 6 is passed through the camera body as shown at 26a in Figure 5, and is connected to the screw 35 by means of which the finger 34 is mounted. It will be noted incidentally that the screw 35 is insulated from the metal plate 25 by means of an insulating bushing 36. The lead 17 shown in Figure 6 is also brought through the camera body as indicated at 17a in Figure 8 and passes through a hole 26a in the insulating disc and makes contact with the metal disc 25.

It will now be observed that at the instant when the contact formed by the rivet 33 and the finger 34 is completed, a circuit is set up from the terminal 13a of the dry cell through contact 19 of the portion 19a thereof to the terminal 15a of the socket. Current passes through the flash bulb and through the prong 15b to the portion 18a of the contact 18. Thence it passes by means of the lead 21 and the lead 21a, the screw 35, the finger 34, the rivet 33, the shutter 30, the disc 25, to the lead 17a and thence by means of the lead 17 to the contact 16 to the opposite pole of the dry cell 13. It will be observed that at all times other than when a contact is made between the finger 34 and the rivet 33, the various portions of the electrical circuit are insulated from each other so that misfire of the flash bulb cannot occur.

It will be clear that modifications may be made in my invention without departing from the spirit thereof, and I therefore do not intend to limit myself except as pointed out in the claims which follow.

Having now fully described my invention, what I claim as new and desire to secure by Letters Patent, is:

1. In a camera having a shutter and a transverse compartment within the body and intermediate the ends thereof, slots extending through said body and into said compartment, a battery in said compartment, a flash bulb having a socket with depending prongs, a pair of conductive elements in said compartment disposed to make contact with said prongs inserted through said slots, one of said elements also arranged to make contact with one of the terminals of said battery, a contact finger mounted in the path of travel of said shutter leads from the other of said conductive elements to said finger and from the other terminal of said battery to said shutter, whereby when said shutter is actuated an electric current is set up through said battery and said flash bulb.

2. A camera comprising a lens, a casing, a transverse compartment within said casing, said casing having slots extending therethrough and into said compartment, a battery in said compartment, a flash bulb having a socket with depending prongs, said prongs extending through said slots into said compartment, conductive elements positioned within said compartment to be contacted by said prongs, one of said conductive elements contacting one of the terminals of said battery, an insulating disc having a shutter opening attached to said casing, a metal disc attached to said insulating disc, a shutter mechanism attached to said metal disc, a contact member attached to said casing, said shutter mechanism having a spring and a rivet, said spring normally holding said rivet from contact with said contact member on the casing, means connecting the other of the conductive elements in the compartment with the contact member and means connecting the metal disc with the other terminal of said battery, said shutter mechanism when actuated exerting pressure on the spring to permit the rivet to contact the contact member so as to set up an electrical circuit and cause the discharge of the flash bulb while the shutter opening is exposed.

GORDON B. POLLOCK.